US009096938B2

(12) United States Patent
Wei et al.

(10) Patent No.: US 9,096,938 B2
(45) Date of Patent: Aug. 4, 2015

(54) GRAPHITE OXIDE AND/OR GRAPHENE PREPARATION METHOD

(71) Applicant: NATIONAL CHIAO TUNG UNIVERSITY, Hsinchu (TW)

(72) Inventors: Kung-Hwa Wei, Hsinchu (TW); Van Thanh Dang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 72 days.

(21) Appl. No.: 13/960,028

(22) Filed: Aug. 6, 2013

(65) Prior Publication Data

US 2014/0216944 A1    Aug. 7, 2014

(30) Foreign Application Priority Data

Feb. 5, 2013    (TW) .............................. 102104356 A (51) Int. Cl.
*C25B 1/00*    (2006.01)
(52) U.S. Cl.
CPC ....................................... *C25B 1/00* (2013.01)
(58) Field of Classification Search
CPC .......... C25B 1/00; C25B 1/02; C25B 31/043; C25B 9/08; B01D 53/326; Y02E 60/50
USPC ....................................................... 204/164
See application file for complete search history.

(56) References Cited

U.S. PATENT DOCUMENTS

| 4,764,263 | A | * | 8/1988 | Gregory et al. | ............... | 205/435 |
| 2014/0061059 | A1 | * | 3/2014 | Dryfe et al. | ................... | 205/555 |
| 2014/0166475 | A1 | * | 6/2014 | Cheng et al. | ............... | 204/229.4 |

OTHER PUBLICATIONS

Paulmier, Thierry and Bell, John M. and Fredericks, Peter M., Deposition of Nano-Crystalline Graphite Films by Cathodic Plasma Electrolysis, Thin Solid Films, 515(5): pp. 2926-2934.
Andrew Richenderfer, Plasma-assisted Electrochemical Synthesis of Pristine Graphene Sheets, Apr. 28, 2012.

* cited by examiner

*Primary Examiner* — Xiuyu Tai
(74) *Attorney, Agent, or Firm* — Rosenberg, Klein & Lee (57) ABSTRACT

A graphite oxide or graphene preparation method includes providing a plasma electrolytic apparatus, where an electrolytic solution is provided and a graphite electrode is configured as a cathode of the plasma electrolytic apparatus; and providing a cathodic current so as to initiate a plasma electrolytic process at the graphite cathode to obtain graphite oxide or graphene. The graphite oxide can be synthesized through plasma electrolytic processing at relatively low temperature under atmospheric pressure within a very short period of time, without the need for concentrated acids or strong oxidizing agents. The present invention may prepare graphite oxide with plasma electrolytic process directly from graphite, without requiring any prior purification. This plasma electrolytic process of the present invention is quite promising and provided with advantages such as low cost, simple setup, high efficiency, and environmental friendliness.

14 Claims, 8 Drawing Sheets

Fig. 7

GRAPHITE OXIDE AND/OR GRAPHENE PREPARATION METHOD

BACKGROUND OF THE INVENTION

1. Field of the Invention

The present invention is directed to a graphite oxide and graphene preparation method, particularly to a graphite oxide and graphene preparation method using plasma electrolytic process.

2. Description of the Prior Art

Graphene is a newly discovered carbon nanomaterial and provided with many excellent properties such as linear spectrum, high electron mobility, the unique optical properties, high elasticity, sturdiness and single atomic width. Therefore, graphene is viewed as a breakthrough nanomaterial for applications in optoelectronics, energy and chemical material fields.

The chemical reduction of exfoliated graphite oxide is widely considered to be the most promising approach for the large-scale production of graphene; this process involves (i) oxidation of graphite to graphite oxide (GO) (ii) exfoliation of GO through ultrasonication or thermal treatment to yield graphene oxide; and (iii) chemical reduction of graphene oxide to a graphitic network of $sp^2$-hybridized carbon atoms.

The mixtures of strong oxidants and concentrated acids used to prepare GO are, however, highly toxic and dangerously unstable, requiring extra safety precautions. Moreover, the discharge of large quantities of acidic waste poses an environmental risk.

Paulmier et al. (Thin Solid Films 515(5):pp. 2926-2934) taught deposition of nano-crystalline graphite films on titanium substrate with atmospheric pressure plasma deposition method from a predominantly ethanol liquid phase by plasma electrolysis. Paulmier used graphite (anode was composed of graphite) as anode although Paulmier formed graphite films by plasma electrolysis. Richenderfer et al. taught a plasma-assisted electrochemical approach for exfoliating pristine graphite in an acidic electrolyte with surfactant to graphene. Richenderfer used graphite as anode and used micro-plasma as the cathode rather than a traditional physical cathode, such as platinum so as to enhance the electric field. In addition, Richenderfer used acidic electrolyte (containing HCl) along with a surfactant in terms of an electrochemical method that in needs of concentrated acid for reaction. Hence, acidic waste manipulation in Richenderferes method is required and leaves room for improvement. Furthermore, the micro-plasma generating cathode with Argon gas indicates the requirement of special apparatus as well as complicated manipulation.

Thus, a new method for the preparation of GO without the need for toxic chemical agents or the harsh oxidation of graphite would be of great interest from the perspectives of both science and technology and environmental protection. This method can also be used to produce graphene sheets directly from graphite cathode providing the anode and the concentration of the basic electrolyte are properly chosen.

SUMMARY OF THE INVENTION

The present invention is also directed to an efficient and environmentally friendly graphite oxide and graphene preparation method so as to provide advantages such as low cost, easy preparation, efficiency and environmentally friendliness.

According to one embodiment of the present invention, a graphite oxide and graphene preparation method includes providing a plasma electrolytic apparatus, wherein a basic electrolytic solution is provided and a graphite electrode is configured as a cathode that can generate plasma upon supplying a high negative threshold potential between 10 and 70V for providing a cathodic current so as to initiate a plasma electrolytic process on the surface of the graphite cathode to obtain graphite oxide or graphene.

The present invention is also directed to graphene preparation. According to one embodiment of the present invention, a graphite oxide preparation method includes providing a plasma electrolytic apparatus, wherein an electrolytic solution is provided and a graphite electrode is configured as a cathode of the plasma electrolytic apparatus; providing a cathodic current so as to initiate a plasma electrolytic process at the graphite electrode to obtain graphite oxide; and exfoliating and reducing the graphite oxide to obtain graphene.

Other advantages of the present invention will become apparent from the following descriptions taken in conjunction with the accompanying drawings wherein certain embodiments of the present invention are set forth by way of illustration and examples.

BRIEF DESCRIPTION OF THE DRAWINGS

The foregoing aspects and many of the accompanying advantages of this invention will become more readily appreciated as the same becomes better understood by reference to the following detailed descriptions, when taken in conjunction with the accompanying drawings, wherein.

DESCRIPTION OF THE PREFERRED EMBODIMENT

Figure 1:
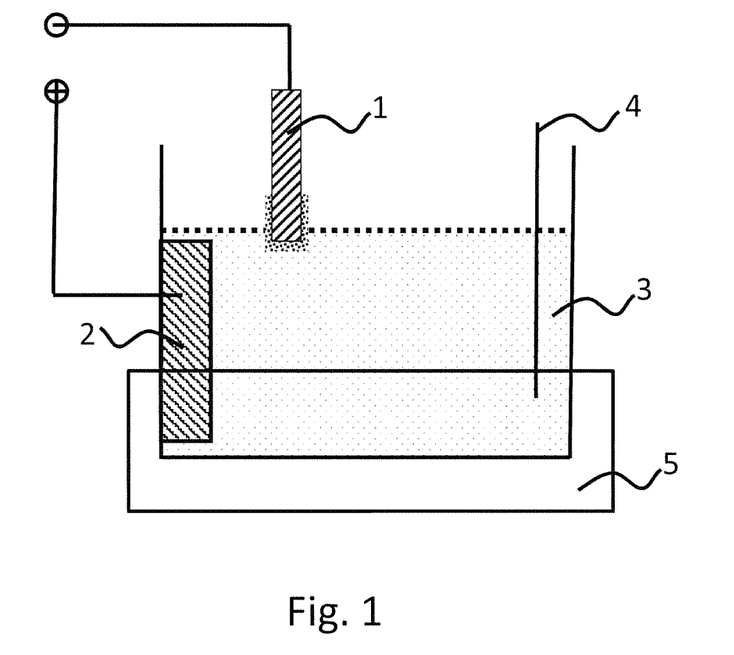
FIG. 1 is a schematic diagram illustrating a plasma electrolytic apparatus of the present invention.

Refer to FIG. 1, which is a schematic diagram illustrating a plasma electrolytic apparatus of the present invention. The graphite oxide and/or graphene preparation method of the present invention includes providing a plasma electrolytic apparatus, where an electrolytic solution 3 is provided and a graphite electrode is configured as a cathode 1 of the plasma electrolytic apparatus; and providing a cathodic current so as to initiate a plasma electrolytic process at the graphite electrode to obtain graphite oxide.

The conventional plasma electrolytic oxidation reaction, also known as micro-arc oxidation (MAO) technology, can be also called anodic spark deposition and is usually used in aluminum, magnesium and titanium alloys. In the case of conventional plasma electrolytic oxidation adopts the work piece at a positive electrode and the electrode at the negative electrode, an oxide film as an insulating layer is formed on the surface of the substrate after the current passes through and the oxide film is also functioned as a base layer. The voltage is continuously applied until the voltage on the substrate exceeds the threshold, and some vulnerable areas of the insulating film will be breakdown, resulting in the phenomenon of micro-arc discharges. There are some changes occurring at the structure of the oxide film and resulted in the anodized metal. Therefore, the voltage applied in the plasma electrolytic reaction is generally higher in comparison to that applied in the electrochemical reaction.

The anode 2 of the plasma electrolytic apparatus of the present invention are made of conductive materials and are not limited in principle, for example but not limited to stainless steel. However, it is noted that the plasma electrolytic oxidation method of the present invention is different from conventional anodic spark deposition reaction. In this way, in one embodiment of the present invention, the anode 2 of the plasma electrolytic apparatus of the present invention is not made of conductive materials such as aluminum, magnesium, or titanium.

Here, the surface area that is in contact with the electrolyte of the anode 2 of the plasma electrolytic apparatus of the present invention is larger than the area that is in contact with the electrolyte of the cathode 1, preferably 11 times larger than that of the cathode 1.

As illustrated in FIG. 1, the anode 2 of the plasma electrolytic apparatus is immersed into the electrolytic solution 3 completely during preparation of graphite oxide. One end of the graphite electrode used at the cathode 1 is barely in touch with the surface of the electrolytic solution 3 and the plasma electrolytic reaction occurs at or near the surface of the graphite electrode.

The graphite electrodes used in the present invention does not require prior purification. Therefore, the source of the graphite electrode of the present invention may include without limitations to natural graphite, compressed graphite, partially oxidized graphite or recycled graphite. Here, the recovered graphite electrode may be obtained from recycled graphite electrode in the recycled batteries.

The pH of the electrolytic solution 3 used in the present invention may range from 11-17, preferably 11-14.

The electrolytic solution 3 of the present invention may contain some appropriate electrolytes so as to control the conductive values. Here, in a preferred embodiment, the electrolytic solution 3 of the present invention may include ammonium ion to control and maintain the pH value of the electrolytic solution 3. In addition, the ammonium ions can be used to produce and release $NH_3$ so as to drive and provide expanded graphite. Examples of ammonium ion provider may include without limitations to $(NH_4)_2SO_4$, $NH_4NO_3$ or $NH_4Cl$. In addition, the electrolytic solution 3 containing carbonate and ammonia may be used for reaction in order to control and maintain the pH value of the electrolytic solution 3 and to promote reaction of graphite electrodes.

In one embodiment, a thermometer 4 (as illustrated in FIG. 1) may be used to measured temperature of the electrolytic solution 3 during plasma electrolytic reaction at the graphite electrode. The initial temperature is preferably 70° C., but the reaction temperature used in the present invention is not limited thereto, the reaction temperature may be maintained at a range of 60-90° C.)

In one embodiment, an ultrasonic vibrator 5 (FIG. 1) is simultaneously subjected in the plasma electrolytic reaction of the graphite electrode to an ultrasonic vibration to assist exfoliation of the graphite oxide. The graphite oxide is then obtained from the above plasma electrolytic reaction and may be subjected to subsequent purification steps. Purification steps may include, but are not limited to, filtration or centrifugation.

The graphite oxide may be obtained by oxidizing graphite using the above plasma electrolytic reaction. The resulting graphite oxide can be re-processed to obtain graphene. In one embodiment, the graphite oxide is then exfoliated into the graphene oxide and subsequent subjected to a reduction reaction to obtain graphene. The exfoliation method of graphite oxide may include, but are not limited to, ultrasonic treatment, heat treatment or chemical treatment. Liquid phase exfoliation using an organic solvent may also be used to obtain graphene oxide or graphene dispersion. Organic solvents include, but are not limited to, NMP (N-Methyl-2-pyrrolidone), DMF (dimethyl fumarate), DMSO (dimethyl sulfoxide), methanol and so on.

The reduction reactions used for reducing graphene oxide to obtain graphene include, but not limited to, hydrazine vapor reduction or thermal annealing.

The present invention is further illustrated by the following working examples, which should not be construed as further limiting.

Preparation of PEGO and HPEGO

Refer to FIG. 1, which illustrates the equipment used in the plasma electrolytic process. The electrolytic solution, comprising KOH (10%, 180 mL) and $(NH_4)_2SO_4$ (5%, 20 mL) at a pH of approximately 14, was preheated to an initial temperature of 70° C. A cylinder graphite rod (GE) or high purity graphite (HG) was used as the cathode 1 connected to a voltage supply unit; the diameter and length of the cathode 1 were 6 and 50 mm, respectively. A stainless-steel grid acted as the anode 2 in the electrochemical system for the plasma expansion process (PEP). The top end of the cathode 1 was placed 0.5-5 mm above the surface of the electrolytic solution 3, while a part of the cathode 1 was submerged along with the anode 2 in the electrolytic solution 3. The surface area of the cathode 1 was much smaller than that of the anode 2. Both electrodes were connected to a DC power supply (TES-6220) with an applied maximum fixed voltage of 60 V and a maximum current intensity of 3 A, resulting in a discharging plasma in the area adjacent to the GE/HG and the electrolytic solution. During the PEP, the high-temperature plasma that existed in the regions close to the interfaces between the GE/HG and the electrolyte supplied thermal energy for the oxidation of the GE/HG. These regions of high-temperature plasma, however, were surrounded by the room-temperature electrolyte. This continuous VPE region was maintained by initially keeping the tip of the GE/HG at a fixed distance, 0.5 mm, from the surface of the electrolytic solution at the beginning of the PEP; this distance gradually increased to approximately 5 mm as the plasma environment reached stability with a current of approximately 1.75 A. The temperature of the solution within the beaker was measured during the process using a conventional mercury thermometer; it was maintained at approximately 70-80° C. To enhance exfoliation and the homogeneity of the reaction, the beaker containing the electrolytic bath was submerged partially in an ultrasonic bath maintained at 20 kHz under a power of 150 W. The length of time in which the samples experienced simultaneous treatment was 10 min.

After PEP treatment, the products were collected through vacuum filtration of the solution through PVDF membranes (average pore size: 0.2 µm) supported on a fritted glass holder. The resulting mixture was washed sequentially with DI water and 1% HCl and then repeatedly with DI water until the pH reached 8. After drying at room temperature under vacuum for 24 h, plasma-expanded graphite oxide (PEGO) was obtained. The graphite oxides produced from the recycled graphite electrode (GE) and high purity graphite (HG) are termed PEGO and HPEGO, respectively. The prepared samples were stored in a drying box at 50° C. until required for use.

Preparation of Exfoliated PEGO (EPEGO)

The obtained PEGO (10 mg) was added to N-methyl-2-pyrrolidone (NMP, 100 mL) to create PEGO dispersion (0.1 mg/mL), which was subjected to exfoliation for 30 min using a tip ultrasonication apparatus (SONICS, 700 W, 75% amplitude). To remove unwanted large graphite particles produced during the exfoliation process, the resultant mixture was centrifuged for 5 min at 4000 rpm and then for 25 min at 1500 rpm. After centrifugation, the top 10 mL of the dispersion was decanted by pipette; herein, this sample is referred to as CGOD. The other resultant mixture was filtered through an AAO membrane (Anodisc; diameter: 47 mm, nominal pore size: 0.02 μm); the solids were then dipped in EtOH to remove residual NMP. The flakes that floated on the surface of the EtOH were collected on a Si substrate. After drying under vacuum at 50° C. for 24 h, a powdery product remained on the surface of the Si substrate; herein, it is named EPEGO.

Adsorption of Methylene Blue (MB) on PEGO

The obtained PEGO powder (20 mg) was added to DI water (4 mL) to create PEGO dispersion (5 mg/mL), which was added to MB solution (10 mg/L, 10 mL) and gently stirred by hand for 2 min and then left the sample equilibrated for 3 h. All experiments were performed at room temperature and a pH of approximately 7. After 3 h, a sample of the supernatant (2 mL) was removed by pipette to evaluate the residual MB concentration in the resultant solution. The amount of MB adsorbed was calculated using Beer's law, based on the absorption peak at 665 nm of the sample in a 1-cm quartz cell, as measured using a UV-Vis spectrophotometer.

Characterization

The structures of the GE, HG, PEGO, HPEGO and EPEGO powders were examined using a D2 X-ray diffractometer equipped with a Cu $K_\alpha$ tube and a Ni filter ($\lambda$=0.1542 nm). Raman spectra of these samples were recorded using a high-resolution confocal Raman microscope (HOROBA, Lab RAM HR) and a 632.8.5-nm HeNe laser source. UV-Vis spectra were recorded using a Hitachi U-4100 spectrophotometer. Selected-area electron diffraction (SAED) patterns and high resolution transmission electron microscopy (HR-TEM) images were recorded using a JEOL 2100 apparatus operated at 200 kV; for HRTEM measurement, a few drops of the EPEGO solution were placed on a Cu grid presenting an ultrathin holey C film. Scanning Electron Microscopy (SEM) was done using a JEOL JSM-6700F scanning electron microscope at 15 kV. Prior to SEM measurement, PEGO and HPEGO samples were coated with a thin (ca. 3 nm) layer of Pt. Atomic Force Microscopy (AFM) images were obtained using a Digital Instruments Nanoscope III apparatus equipped with a NANOSENSORS Si tip, operated in the tapping mode with a resonance frequency of 130 kHz. AFM samples were prepared by drop-casting the CGOD solution onto the surface $Si/SiO_2$ substrate and then drying in air.

Figure 2:
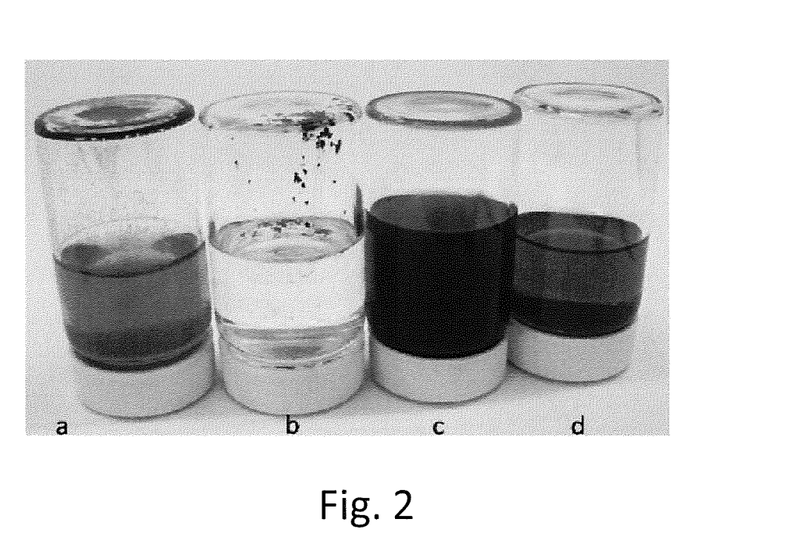
FIG. 2 displays the dispersion of PEGO in various solvents after performing the plasma exfoliation process.

FIG. 2 displays the dispersion of PEGO in various solvents after performing the plasma exfoliation process. FIG. 2a reveals that some of the PEGO obtained from the PEP in the electrolytic solution precipitated to the bottom of the glass vial; FIG. 2b displays the PEGO obtained after filtering and re-dispersing in NMP without ultrasonication; FIG. 2c indicates that ultrasonication caused the PEGO to become dispersed in the NMP; and FIG. 2d reveals the clear PEGO/NMP solution after centrifugation. FIGS. 2c and 2d indicate that the PEGO solutions were rather homogeneous; they remained stable for long periods of time (12 weeks) with almost no precipitations.

Figure 3A:
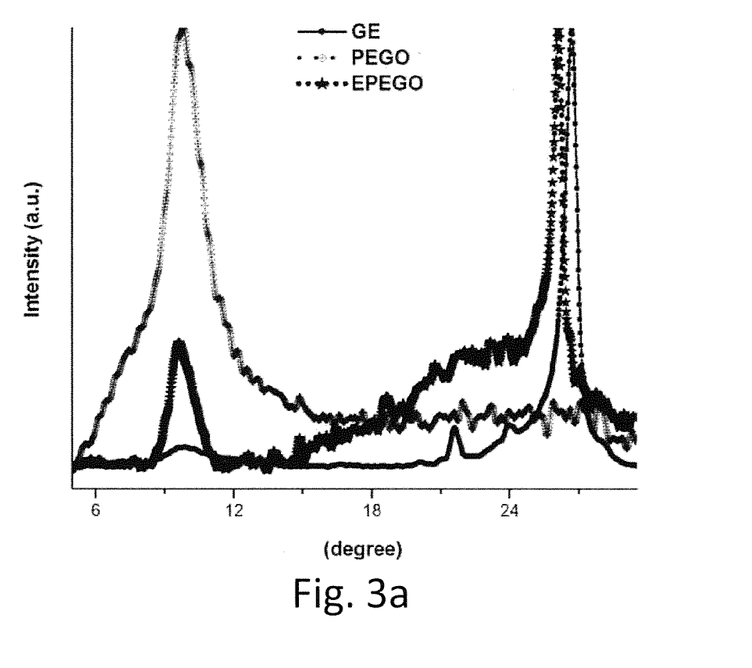
FIGS. 3a to 3b presents X-ray diffraction (XRD) patterns and C 1s XPS spectrum of the GE, PEGO, and EPEGO samples of the present invention.

FIG. 3a presents X-ray diffraction (XRD) patterns of the GE, PEGO, and EPEGO samples. The diffraction curve of the GE displays a sharp, high-intensity peak near a value of 2θ of 26.6° that we assign to the characteristic peak (002) of graphite; this signal indicates a highly ordered crystal structure with a value of $d_{002}$ (the spacing between two neighboring atomic planes in graphite) of 0.334 nm. In addition, weak peaks appear at values of 2θ of 21.5 and 23.5°, possible because of some additives or impurities in the GE. For PEGO, after the GE had experienced the PEP, the characteristic (002) peak at a value of 2θ of 26.6° almost disappeared completely; the intensity of a signal at a value of 2θ of 9.8°, corresponding to a value of $d_{001}$ of 0.896 nm, the characteristic (001) peak of GO, increased significantly for the PEGO, similar to that reported previously. Moreover, the full-width-at-half maximum (FWHM) of the (001) peak for PEGO was 1.52 nm, significantly larger than that (0.59 nm) for GE. The shift of the characteristic (002) peak of PEGO to a lower angle (2θ=9.8°; $d_{001}$=0.896 nm) from that for pristine GE (2θ=26.6°; $d_{002}$=0.334 nm) can be explained by the fact that water molecules were inserted between the sheets of carbon. The broadening of the line width of the peak at a value of 2θ of 9.8° for PEGO indicates the successful preparation of an intercalated graphite compound. For the EPEGO, the intensity of characteristic (001) peak at a value of 2θ of 9.8° ($d_{001}$=0.896 nm) decreased significantly, with a large peak appearing at a value of 2θ of approximately 26° ($d_{002}$=0.341 nm). This $d_{002}$ spacing for the EPEGO is close to the spacing of the characteristic (002) peak of GE (0.334 nm), indicating that the EPEGO contained exfoliated graphite sheets or graphite nanoplatelets. The presence of a peak for the EPOGE at a value of 2θ of 9.8° indicates, however, that a significant portion of PEGO had not been exfoliated.

Figure 3B:
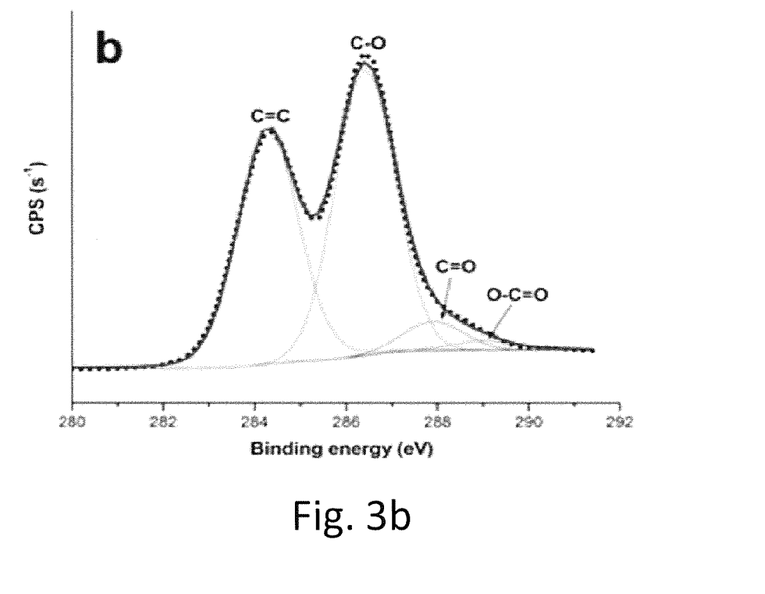

FIG. 3b demonstrates the C is XPS spectrum of PEGO, where the peak at ~284.4 eV is attributed to the C═C (sp2-hybridized carbon atoms,) and the large and broad peak at ~286.4 eV is caused by C—O (hydroxyl and epoxy,) groups along with two de-convoluted minor components at ~287.9 eV and at 289.0 eV that resulted from C═O (carbonyl) and O—C═O (carboxylate carbon) groups, respectively, confirming the presence of graphite oxide and being consistent with the results of XRD.

Figure 3C:
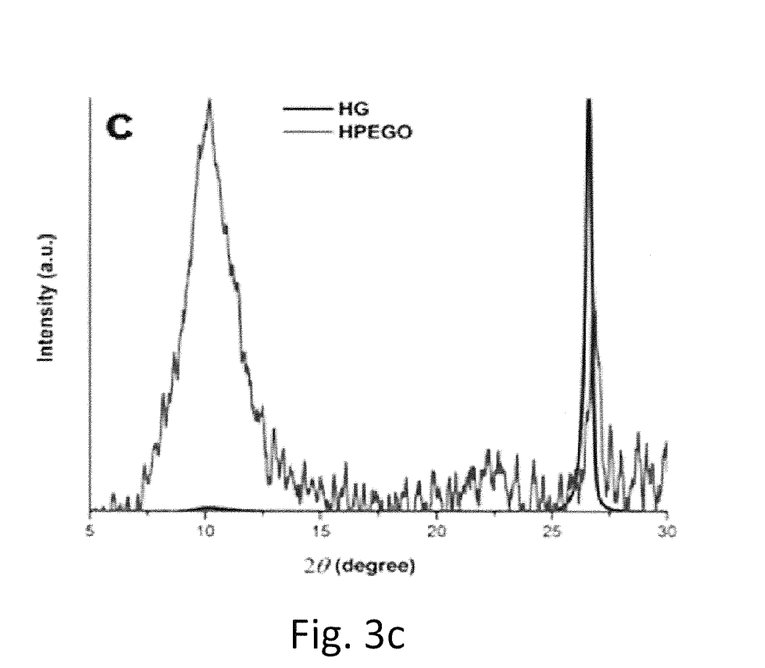
FIG. 3c presents X-ray diffraction (XRD) patterns of the HG and HPEGO.
Figure 3D:
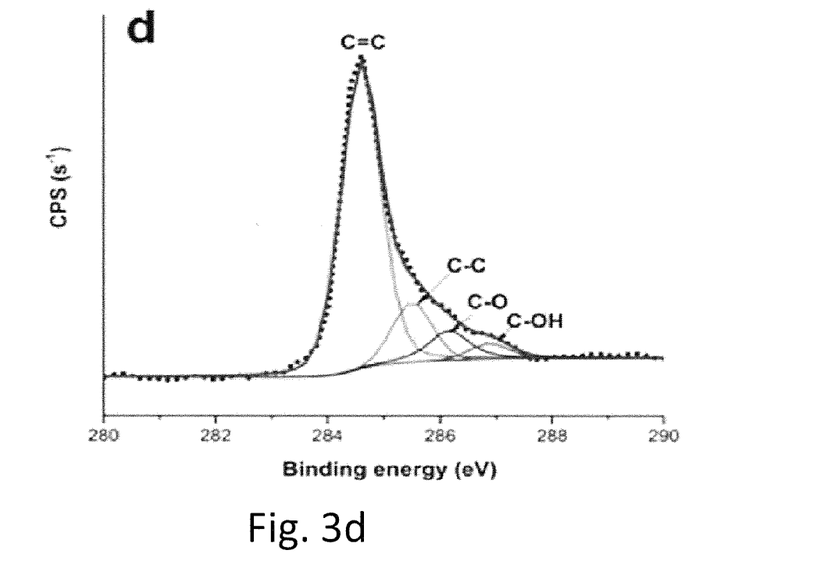
FIG. 3d presents C is XPS spectrum of the HPEGO samples of the present invention.

FIGS. 3c and 3d presented the XRD pattern and C is XPS spectrum of HG and HPEGO, respectively. The peak at 2θ=26.6° in the XRD curve of HPEGO sample confirms the presence of a substantial amount of the graphite phase, suggesting a lower conversion of high purity graphite (HG) into graphite oxide with the CP process (cathodic plasma) than in the case of GE. In addition, the shoulder next to the C is XPS peak at 286 eV for the HPEGO samples can also be de-convoluted into four 35 minor peaks at 284.6, 285.5, 286.1 and 286.9 eV that were attributed to C═C (sp2-hybridized carbon atoms), C—C (sp3-hybridized carbon atoms,), C—O (hydroxyl group) and COOH (alcohol/ether groups), respectively, indicating graphite oxide-like structure.

TABLE 1

The relative atomic percentage of various functional groups in PEGO and HPEGO estimated based on the area under the C 1 s peaks

| | C═C (%) | C—C (%) | C—O (%) | C—OH (%) | C═O (%) | O—C═O (%) |
|---|---|---|---|---|---|---|
| PEGO | 43 | | 50 | | 5 | 2 |
| HPEGO | 74 | 13 | 9 | 4 | | |

Table 1A lists a quantitative comparison on the amounts of various oxygen containing groups in PEGO and HPEGO bases on the area under the XPS peaks. The atomic percentage of carbon in HPEGO (87%) is higher than that (43%) of PEGO, which translated to a carbon to the oxygen bonded carbon (C/O) ratio of 1.75 and 7.0, respectively, indicating that the CP process is more effective of generating GO from GE than from HG. This can be attributed to the more uniform packing of graphene layers in HG than in GE, as reflected in the much sharper (002) peak, at a value of 2θ of 26.6°, for the HG than that of the GE in the XRD curves.

Figure 4A:
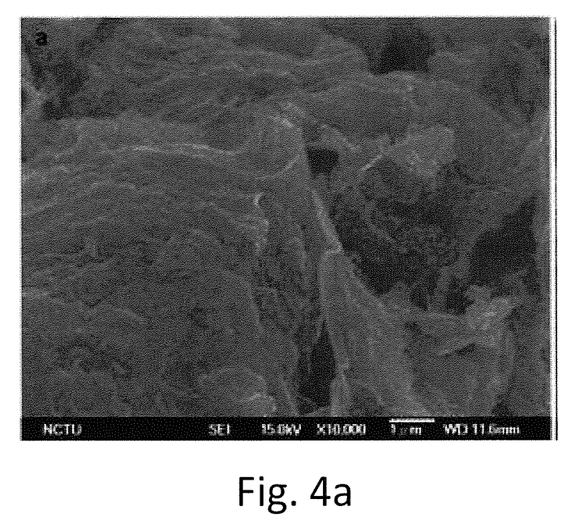
FIGS. 4a to 4c present SEM images of the GE, PEGO, and EPEGO samples of the present invention.
Figure 4B:
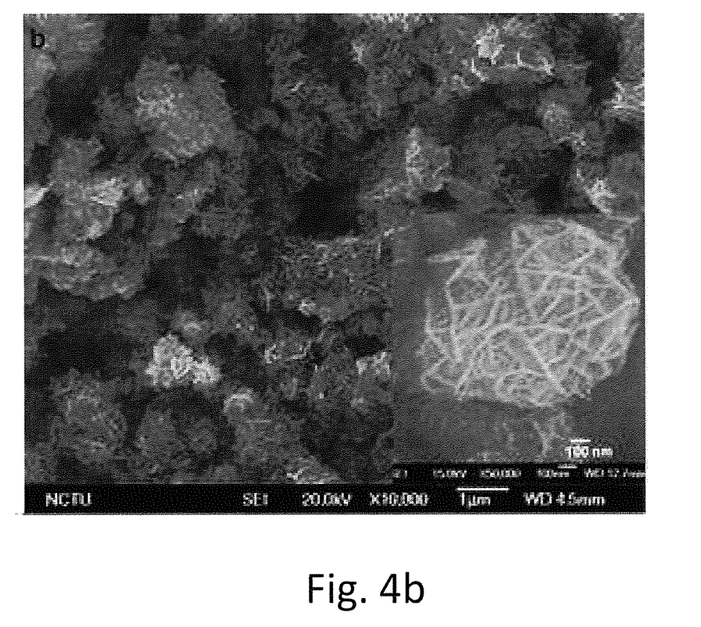
Figure 4C:
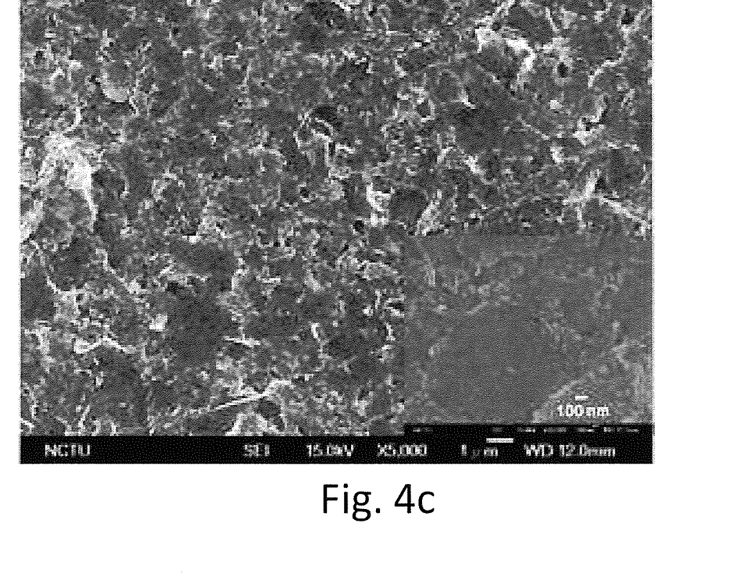
Figure 5A:
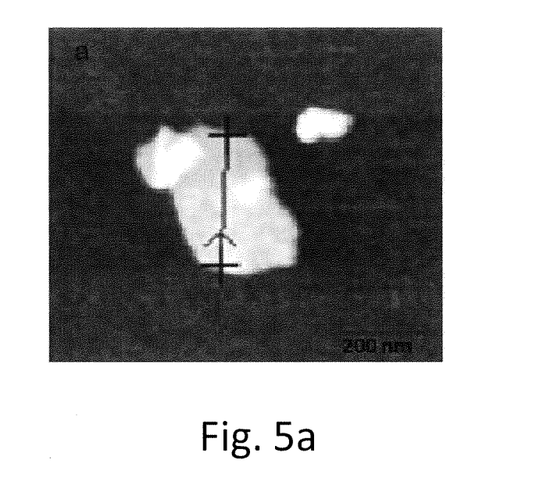
FIGS. 5a and 5b illustrate the shapes, thicknesses, and lateral dimensions obtained from a typical AFM topography image of the EPEGO of the present invention.
Figure 5B:
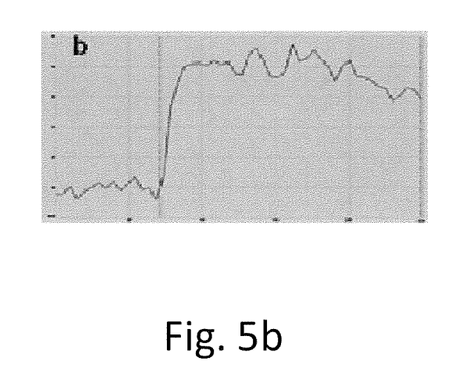
Figure 5C:
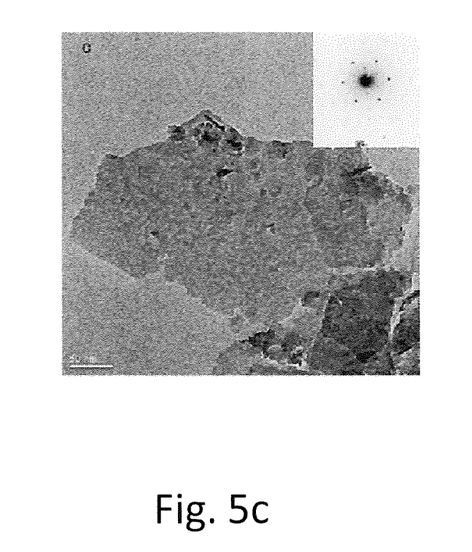
FIG. 5c illustrates in an HRTEM image with an SAED of the exfoliated EPEGO of the present invention.

FIG. 4 presents SEM images of the GE, PEGO, and EPEGO samples; they reveal large structural changes in the prepared samples. FIG. 4a indicates that the GE in powder form consisted largely of multilayered graphite clusters. FIG. 4b reveals that the PEGO, produced after the GE had been subjected to the PEP process, featured crumpled structures and a heterogeneous surface; a high-magnification image of the PEGO (inset to FIG. 4b) indicates that the PEGO possessed spheroidal features having dimensions of 1-3 μm. The crumpled PEGO is composed of many thin graphite oxide sheets and the interaction between each crumpled PEGO is very weak, thus it can be expected to further exfoliate to thinner graphite oxide sheets by utilizing ultrasonication. FIG. 4c reveals that the graphite oxide sheets, with lateral width from several hundreds of nanometers to 3 μm, can be produced after having been subjected to ultrasonication; the inset displays a magnified view of one such exfoliated sheet having a thickness (ca. 10-50 nm) close to the size of a nanoplatelet. Image analysis calculation results based on 20-50 exfoliated graphite oxide nanosheets revealed that the average sheet diameter was approximately 1.5 μm with a thickness of approximately 10-30 nm, based on cross-sectional imaging of the folded edges of exfoliated graphite oxide nanosheets after tilting the sample from 0 to 25°. Notably, the exfoliated EPEGO sheets could be imaged clearly by SEM without the charging effects that occurred for PEGO. FIGS. 5a and 5b reveals the shapes, thicknesses, and lateral dimensions obtained from a typical AFM topography image of the EPEGO; this EPEGO sample had lateral dimension of approximately 250 nm with a thickness of approximately 4 nm, corresponding to approximately 3 layers of graphene, based on an interlayer spacing of 1 nm. Furthermore, the exfoliated EPEGO could be clearly identified in an HRTEM image, appearing translucent, with an SAED pattern that reveals a typical hexagonally arranged lattice of carbon. Two hexagonal patterns were overlapping each other, suggesting that the EPEGO samples comprised multi-layered graphene sheets, consistent with FIG. 4c. The sizes and thicknesses of the nanoplatelets visualized in the TEM and AFM images were less than those in the SEM images, because the samples had been diluted in NMP. We suspect that optimizing the plasma power and ultrasonication conditions would allow control over the lateral dimensions and thicknesses of these samples.

The XRD, SEM, AFM, and TEM data suggested that the PEGO served as a good precursor for the preparation of graphite nanoplatelets. Notably, when using VPE we could oxidize graphite, without prior purification to remove additives or impurities, into GO within approximately 10 min, rather than the typical treatment with concentrated acid and strong oxidizing agents that requires approximately 100 h. Taking into consideration the aspects of user-friendliness and recyclability, this VPE calorific process appears to be a very efficient means of synthesizing GO.

Figure 6A:
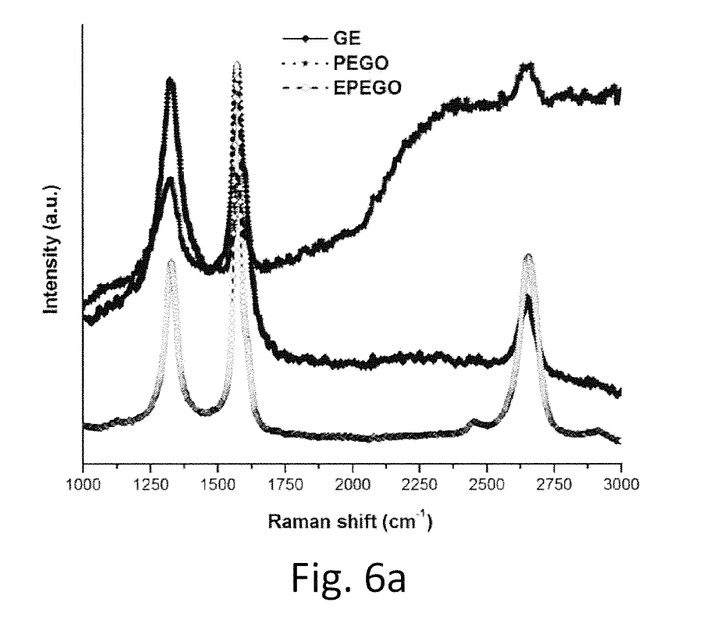
FIGS. 6a and 6b display Raman spectra of the GE, PEGO, and EPEGO samples of the present invention.
Figure 6B:
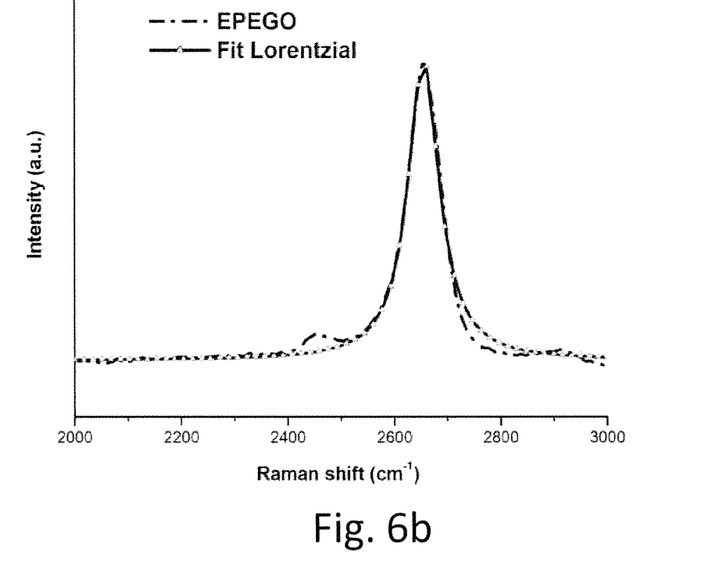

FIG. 6a displays Raman spectra of the GE, PEGO, and EPEGO samples, revealing their D (defect), G (graphite), and 2D (doubly generated G) bands at 1325, 1570, and 2658 $cm^{-1}$, respectively. The D band of the GE has relatively high intensity, suggesting that the GE sample featured some defect structures, such as disordered carbon structures or impurities, consistent with the XRD data. The peak positions of the D and G bands of the EPEGO sample are similar to those of the GE and PEGO samples, but the $I_D/I_G$ intensity ratio for the EPEGO (0.53) was significantly lower than those (0.97) for both the GE and PEGO. Moreover, the intensity and sharpness of the G band of the EPEGO both increased significantly relative to those of the GE and PEGO samples, suggesting that disordered C structures, such as spa-hybridized C atoms, were partially removed and that graphitic domains were restored in the EPEGO sample during the ultrasonication process. FIG. 6b reveals that the 2D band for EPEGO consisted of a single-Lorentzian 2D peak; its FWHM of approximately 70 $cm^{-1}$ was, however, almost double that (ca. 35 $cm^{-1}$) of the 2D peak of graphene, consistent with the multi-layer features of turbo-stratic graphite or graphene. These results coincide very well with the data from previous SEM and HRTEM studies.

Figure 7:
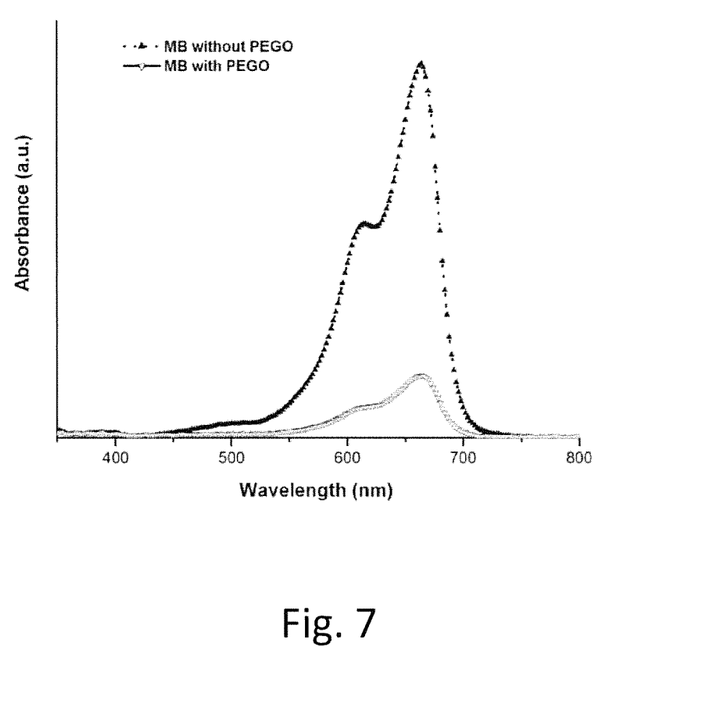
FIG. 7 reveals adsorption of MB on the PEGO of the present invention.

To demonstrate the applicability of these materials, we used PEGO for the removal of MB from aqueous solutions. Because PEGO had a spheroidal structure, it could form 3D agglomerates with a large surface area, making it a potentially useful absorbent. In addition, an MB solution (10 mL), which initially displayed a typical blue color, turned into a pale blue solution 3 h after addition of PEGO solution (5 mg/mL, 4 mL), revealing that PEGO could remove MB efficiently with most of the MB-adsorbed PEGO having precipitated to the bottom of the glass container. After decanting the supernatant solution via pipette, we collected the aggregate and dried it at room temperature for 24 h. Notably, the PEGO could to be used readily without any pre-treatment step. FIG. 7 displays UV-Vis spectra of the MB solution in the presence and absence of PEGO. We used the absorbance in each case to calculate the percentage adsorption of MB on the PEGO:

$$\text{Adsorption efficiency} = [(A_i - A_f)/A_i] \times 100 [\%] \quad (1)$$

where $A_i$ and $A_f$ are the initial and the final absorbance values, respectively.

The intensity of the characteristic peak at 665 nm for the MB solution that had been treated with PEGO was dramatically lower than that of the pristine MB solution, indicating a significant drop in the MB concentration in the solution; the removal efficiency, determined using equation (1), was 97%. Therefore, our PEGO material is a promising adsorbent for the removal of dyes or pigments, such as MB, from aqueous solutions.

In summary, the present invention includes plasma electrolytic process and ultrasonic oscillations and may produce graphite oxide in a relatively low temperature, pressure and within a very short time, and does not require concentrated strong acids and oxidizing agents. The present invention is provided with exothermal effect by vapor plasma envelope; therefore, the plasma electrolytic process is an effective method for graphite oxide production. The graphite electrodes of the present invention can be used without any prior purification, so many kinds of materials can be used (e.g. recycled graphite electrodes), and it has advantages such as low cost, easy to prepare, efficient and environmentally friendliness.

While the invention can be subject to various modifications and alternative forms, a specific example thereof has been shown in the drawings and is herein described in detail. It should be understood, however, that the invention is not to be limited to the particular form disclosed, but on the contrary, the invention is to cover all modifications, equivalents, and alternatives falling within the spirit and scope of the appended claims.

What is claimed is:

1. A graphite oxide and/or graphene preparation method, comprising:
    providing a plasma electrolytic apparatus, wherein a basic electrolytic solution is provided and a graphite electrode is configured as a cathode of the plasma electrolytic apparatus; and
    providing a cathodic current so as to initiate a cathodic plasma exfoliation process at the surface of graphite electrode that have been in touch with the electrolyte to obtain graphite oxide and/or graphene.

2. The preparation method as claimed in claim 1, wherein the graphite electrode includes natural graphite, compressed graphite, partially oxidized graphite or recycled graphite.

3. The preparation method as claimed in claim 1, wherein one end of the graphite electrode is barely above the surface of the electrolytic solution.

4. The preparation method as claimed in claim 1, wherein the plasma exfoliation process occurs at or near the surface of graphite electrode.

5. The preparation method as claimed in claim 1, wherein a surface area of the anode that is submerged in the electrolyte is larger than a surface area of the cathode that is contact with the electrolyte for the plasma electrolytic apparatus.

6. The preparation method as claimed in claim 1, wherein a surface area of the anode of the plasma electrolytic apparatus is 11 times larger than a surface area of the cathode.

7. The preparation method as claimed in claim 1, wherein the anode of the plasma electrolytic apparatus is not made of aluminum, magnesium, or titanium.

8. The preparation method as claimed in claim 1, wherein an anode of the plasma electrolytic apparatus is immersed into the electrolytic solution completely during the plasma exfoliation process.

9. The preparation method as claimed in claim 1, wherein the pH of the electrolytic solution ranges from 11-17.

10. The preparation method as claimed in claim 1, wherein the pH of the electrolytic solution ranges from 11-14.

11. The preparation method as claimed in claim 1, wherein the electrolytic solution comprises ammonium ion.

12. The preparation method as claimed in claim 1, wherein the electrolytic solution comprises carbonate and ammonia.

13. The preparation method as claimed in claim 1, wherein an ultrasonic vibration is simultaneously subjected in the plasma exfoliation process.

14. A graphene preparation method comprises:
    providing a plasma electrolytic apparatus, wherein an electrolytic solution is provided and a graphite electrode is configured as a cathode of the plasma electrolytic apparatus;
    providing a cathodic current so as to initiate a cathodic plasma exfoliation process at the graphite electrode to obtain graphite oxide and/or graphene; and
    exfoliating and reducing the graphite oxide to obtain graphene.

* * * * *